(12) United States Patent
Ukon

(10) Patent No.: US 6,870,924 B1
(45) Date of Patent: Mar. 22, 2005

(54) AUTOMATIC CALL DISTRIBUTION SYSTEM AND METHOD

(75) Inventor: Shinichi Ukon, Tokyo (JP)

(73) Assignee: NEC Corporation, Tokyo (JP)

( * ) Notice: Subject to any disclaimer, the term of this patent is extended or adjusted under 35 U.S.C. 154(b) by 320 days.

(21) Appl. No.: 09/690,727

(22) Filed: Oct. 18, 2000

(30) Foreign Application Priority Data

Oct. 19, 1999 (JP) .......................................... 11-296901

(51) Int. Cl.⁷ ............................................. H04M 3/00
(52) U.S. Cl. .............................. 379/265.02; 379/88.19; 379/88.2
(58) Field of Search .......................... 379/88.12, 88.19, 379/88.2, 207.15, 211.03, 265.02, 265.11; 370/270, 352

(56) References Cited

U.S. PATENT DOCUMENTS

| | | | | |
|---|---|---|---|---|
| 5,268,958 A | * | 12/1993 | Nakano ...................... | 379/246 |
| 5,329,523 A | * | 7/1994 | Saito et al. .................. | 370/270 |
| 5,450,482 A | | 9/1995 | Chen et al. .................. | 379/230 |
| 5,537,470 A | * | 7/1996 | Lee ........................ | 379/265.11 |
| 5,703,943 A | * | 12/1997 | Otto ....................... | 379/265.11 |
| 5,748,723 A | * | 5/1998 | Hanai et al. ............ | 379/265.02 |
| 5,857,018 A | * | 1/1999 | Sumner et al. ........ | 379/265.13 |
| 5,870,464 A | * | 2/1999 | Brewster et al. ............ | 379/219 |
| 5,914,951 A | * | 6/1999 | Bentley et al. ............. | 370/352 |
| 5,920,621 A | | 7/1999 | Gottlieb .................. | 379/112.01 |
| 6,324,263 B1 | * | 11/2001 | Sherwood et al. ....... | 379/88.19 |
| 6,332,021 B2 | * | 12/2001 | Latter et al. ........... | 379/142.01 |

FOREIGN PATENT DOCUMENTS

| | | |
|---|---|---|
| GB | 2 329 551 | 3/1999 |
| JP | 6-232982 | 8/1994 |
| JP | A 10-51550 | 2/1998 |
| JP | A 11-98252 | 4/1999 |

* cited by examiner

Primary Examiner—Bing Q. Bui
(74) Attorney, Agent, or Firm—Young & Thompson

(57) ABSTRACT

A method and system for automatically distributing calls from calling parties to agents in a telephonic service provider facility, in which a database associates specific calling parties with specific agents. An identifier of a calling party is compared to identifiers in the database and the calling party is connected to the agent with whom the calling party has been associated if the identifier matches one in the database. If the identifier of the calling party does not match one of the identifiers in the database, a voice message is provided to the calling party to urge the calling party to provide a further identifier, which is then compared to the identifiers in the database. If the further identifier matches one of the identifiers in the database, the calling party is connected to the agent with whom the calling party has been associated.

2 Claims, 3 Drawing Sheets

AUTOMATIC CALL DISTRIBUTION SYSTEM AND METHOD

BACKGROUND OF THE INVENTION

1. Field of the Invention

This invention relates to an automatic call distribution system and method wherein, when a large number of calls terminate at a private branch exchange, the terminating calls are distributed automatically to a plurality of extension terminals or called parties, and more particularly to a system and a method by which an incoming call is connected preferentially to a specific called party.

2. Description of the Related Art

An automatic call distribution system of the type mentioned is conventionally known and disclosed in Japanese Patent Laid-Open No. 232982/1994 wherein, in order to terminate a call at a pilot extension line from an exchange and route the call from the pilot extension line to a free extension line of an extension line group, an extension line group of the routing destination is provided corresponding to the pilot extension line, and a priority is applied to the extension lines which form the extension line group or a priority is applied to a plurality of extension groups and a call terminating at the pilot extension line is routed to a free extension line based on the priority.

In the conventional call distribution control system described above, a priority is applied to agents or extension terminals of each extension line group and ACD calls are distributed to free agents in accordance with the priority. In particular, for example, a comparatively great number of incoming calls are distributed to an agent which has a comparatively high priority level and a comparatively high priority level is applied to a skilled person or a full-service person so that the transfer number of ACD calls which are terminated at each agent can be controlled in accordance with the degree of the skill or the degree of the full-service thereby to allow efficient and fine services. Further, a skilled agent who is ready for a plurality of works is allocated with a predetermined priority to a plurality of extension line groups so that the skilled agent can be utilized sufficiently and efficient fine services are allowed. Furthermore, by designating a plurality of extension line groups based on a routing table to search for free agents in accordance with the priority, even when calls are concentrated upon one extension line group, the calls are terminated at agents of the other extension line groups to provide services to callers.

However, since agents who are skilled in the work are disposed in a priority within one extension line group or a plurality of groups and ACD calls are distributed in number in accordance with the priority but a corresponding agent corresponding to each caller is not fixed, that is, a full-service agent is not fixed for each caller, when an ACD call is originated from the same caller again or when an ACD call is terminated again after a call is interrupted during talking, the same agent may not necessarily respond to the ACD call, and consequently, the caller is obliged to explain contents of the inquiry from the beginning. Consequently, a surplus burden is imposed on the caller, and not only deterioration in service is invited, but also the efficiency of use of circuits drops.

SUMMARY OF THE INVENTION

It is an object of the present invention to provide an automatic call distribution system wherein a full-service called party can respond to ACD calls from the same caller.

In order to attain the object described above, according to an aspect of the present invention, there is provided an automatic call distribution system for terminating an ACD call which is an inquiry call from an unspecific caller to a predetermined called party to provide various response services, comprising a database in which caller specification numbers for specifying callers and called party individual call numbers for specifying called parties are registered in a corresponding relationship to each other so that an ACD call from a certain specific caller may terminate at a specific called party, and a called party individual ACD call control processing section for searching, when an ACD call is received, for a called party individual call number corresponding to a caller specification number for specifying the caller of the ACD call from the database and connecting the ACD call with the called party individual specification number.

Preferably, the automatic call distribution system further comprises call preferential connection information registration means for storing call preferential connection information including a caller specification number for specifying a caller and a called party individual call number of a called party to which an ACD call from the caller is to be connected preferentially into the database.

Otherwise, the automatic call distribution system may further comprise means for recognizing a caller specification number form an ACD call, call preferential connection information inquiry means for inquiring the data base about the recognized caller specification number and reading out a called party individual call number corresponding to the caller specification number, and call connection means for performing connection processing of the ACD call preferentially to the called party individual call number read out by the call preferential connection information inquiry means.

The call connection means may include means for performing, when the called party of the called party individual call number read out by the call preferential information inquiry means is busy or in a termination rejection state and the ACD call cannot be connected preferentially to the called party, wait processing of the ACD call for the called party of the called party individual call number and signaling a speech guidance for notification to the caller that the called party of the destination of the preferential connection cannot respond and is in a wait state.

As an alternative, the call connection means may include means for performing, when the called party of the called party individual call number read out by the call preferential information inquiry means is busy or in a termination rejection state and the ACD call cannot be connected preferentially to the called party, wait processing of the ACT call for the called party of the called party individual call number, discriminating whether or not connection to a called party other than the called party of the called party individual call number is possible, and connecting the ACD call in the wait processing state to the called party.

As another alternative, the call connection means may include means for performing, when the called party of the called party individual call number read out by the call preferential information inquiry means is busy or in a termination rejection state and the ACD call cannot be connected preferentially to the called party, wait processing of the ACT call for the called party of the called party individual call number, discriminating whether or not connection to a called party other than the called party of the called party individual call number is possible, and connecting, when the connection is possible, the ACD call in the wait processing state to the called party, but performing, when the connection is not possible, wait processing of the ACD call for the called party other than the called party of the called party individual call number and further discriminating the possibility of connection successively to other called parties to connect the ACD call.

When the called party of the called party individual call number read out by the call priority information inquiry means is in a termination call non-connection state wherein the called party is busy or in a termination rejection state and the ACD call cannot be connected preferentially to the called party, the call connection means may perform called party individual ACD call control processing for connecting the ACD call in a unit of a called party individual or split individual ACD call control processing for terminating the ACD call in a unit of an ACD split.

The automatic call distribution system may further comprise call preferential connection information storage means for recognizing, when an ACD call is connected to a called party by the call connection means to establish a talking state, the caller specification number and a called party individual call number of a called party who responds to the ACD call as call preferential connection information and storing the call preferential connection information into the database.

Preferably, the automatic call distribution system further comprises specific caller call preferential connection information registration means for determining a full-service called party who should respond to an ACD call from a specific caller in advance and storing the caller specification number of the specific caller and the called party individual call number of the full-service called party as call preferential connection information into the database in advance.

According to another aspect of the present invention, there is provided an automatic call distribution method for terminating an ACD call which is an inquiry call from an unspecific caller to a predetermined called party to provide various response services, comprising a first step of recognizing a caller specification number from the ACD call, a second step of inquiring a database about the caller specification number recognized in the first step and reading out a called party individual call number of a called party registered in a corresponding relationship to the caller specification number, and a third step of connecting the ACD call preferentially to the called party individual call number read out in the second step.

Preferably, the automatic call distribution method further comprises a fourth step of connecting, when a called party individual call number of a called party who is to respond to an ACD call corresponding to the caller specification number is not registered in the database as a result of the inquiry of the database about the caller specification number in the second step, the ACD call to a called party selected based on a predetermined criterion, and a fifth step of storing, when the called party selected in the fourth step responds to the ACD call to establish a talking state, the caller specification number and the called party individual call number of the called party who has responded to the ACD call as call preferential connection information into the database.

Otherwise, the automatic call distribution method may further comprise a sixth step of determining a full-service called party who should respond to an ACD call from a specific caller in advance and storing the caller specification number of the specific caller and the called party individual call number of the full-service called party as call preferential connection information into the database in advance.

In the automatic call distribution system and the automatic all distribution method, a caller of an ACD call terminating at an attendant extension line telephone set or position of the ACD system is specified, and if the specified caller number is registered in the database, then an individual call number to a called party to which an ACD call from the specified caller is to be preferentially connected is read out from the database and call connection processing to the called party individual call number is performed, whereby called party call connection processing to the called party designated with the called party individual call number is performed preferentially to connection to a pilot number of an ACD split which is call connection to an unspecific called party.

If the specified called party number is not registered in the database, then known automatic call distribution processing is performed, and simultaneously, the specified caller number and an individual call number of the called party who has responded to the ACD call are registered into the database so that the called party who should respond to later ACD calls from the same caller is fixed.

If the called party registered in the database is busy or in a termination rejection state and is in a waiting state wherein an ACD call cannot be connected to the called party who is called with a called party individual call number by a caller and to whom the ACD call should be connected preferentially, then signaling processing of a speech guidance designated for each called party individual call number that the called party is waiting for distribution of the call is performed and called party individual ACD call control processing set for each called party individual call number is performed.

For example, when it is confirmed whether or not connection to some other called party than the pertaining called party who is not in a connectable state at present is possible, call control is performed in cooperation with called party individual ACD control processing for confirmation in a unit of a called party individual and split individual ACD call control processing for confirmation in a unit of an ACD split is performed.

When the call from the caller to the ACD system is connected to the called party and enters a talking state as a result of the call control, the caller number specified upon the termination and the individual call number of the called party who has responded to the call are stored as call preferential connection information of the ACD system into the call preferential connection information database.

Further, a caller number of a specific client or user and a full-service called party who should respond to the caller number are registered in advance in the database, and when an ACD call terminates, the caller of the ACD call is specified. Then, a called party individual call number registered in a corresponding relationship to the caller number of the specific client or user is read out from the database, and the ACD call is connected to an ACD position of a corresponding called party in accordance with the called party individual call number.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
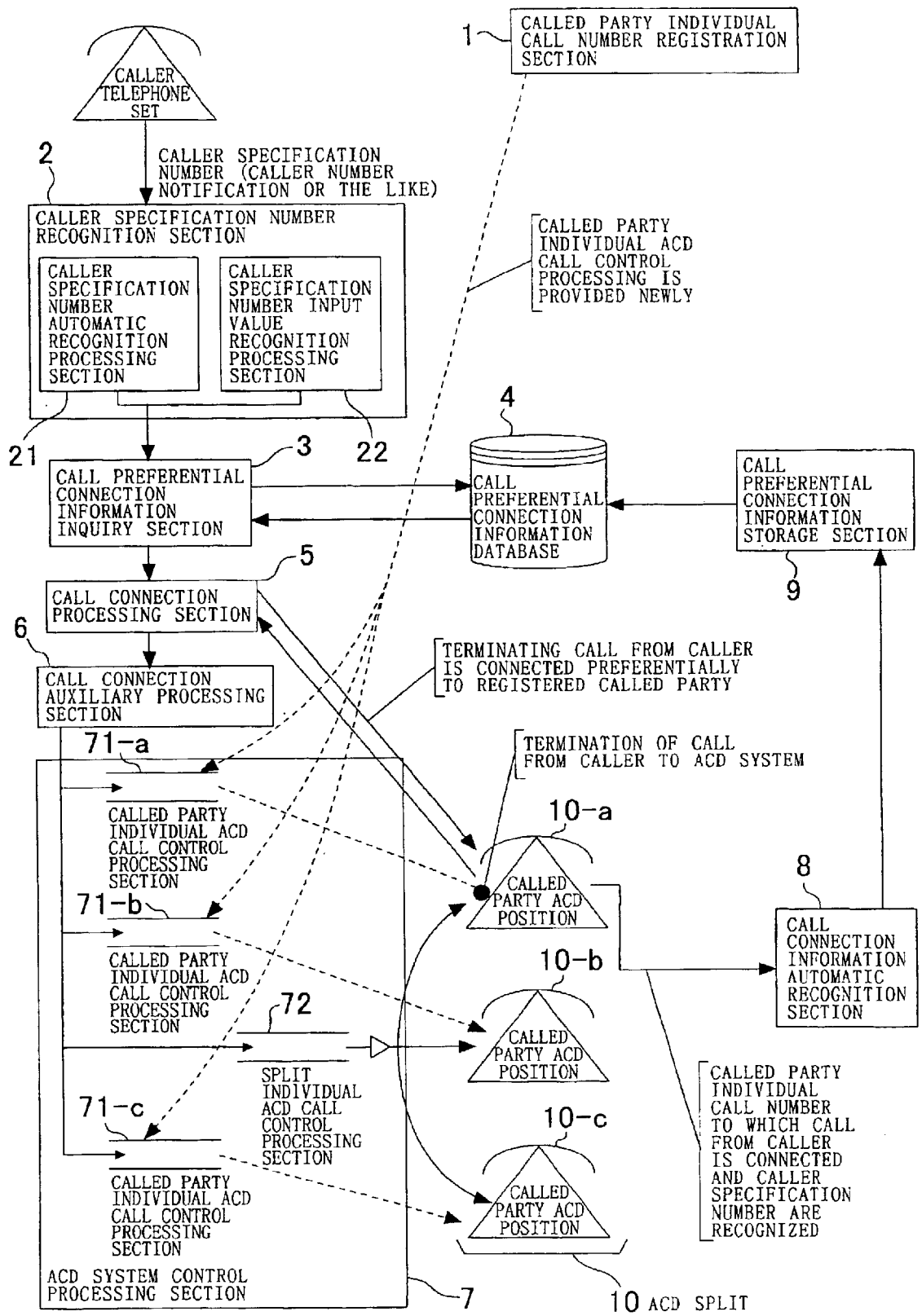
FIG. 1 is a block diagram showing a main construction of an automatic call distribution system to which the present invention is applied.

Referring first to FIG. 1, there is shown an automatic call distribution system to which the present invention is applied. The automatic call distribution system shown includes a called party individual call number registration section 1, a caller specification number recognition section 2, a call preferential connection information inquiry section 3, a call preferential connection information database 4, a call connection processing section 5, a call connection auxiliary processing section 6, an ACD system control processing section 7, a call connection information automatic recognition section 8, a call preferential connection information storage section 9, and an ACD split 10 including called party ACD positions 10-a, 10-b and 10-c.

The called party individual call number registration section 1 registers called parties who can respond to a call terminating at the ACD split 10 of the ACD system, and registers called party individual call numbers for calling a called party to allow speech guidance processing of waiting of a terminating call to a called party individual and called party individual ACD call connection processing of performing control of a terminating call.

The caller specification number recognition section 2 includes a caller specification number automatic recognition processing section 21 for recognizing a number (for example, a caller number notification) for specifying, when a call terminates at the ACD system from a caller, the caller and automatically recognizing a number for specifying the caller sent thereto from the caller such as a caller number notification, and a caller specification number input value recognition processing section 22 for urging, when the number for specifying a caller cannot be recognized automatically, the caller to input a number for specifying the caller separately and recognizing a caller specification number sent thereto from the caller.

The call preferential connection information inquiry section 3 performs processing of inquiring the call preferential connection information database 4 about a caller specification number recognized by the caller specification number recognition section 2 and calling, when a coincident caller specification number is present in the database, a caller party individual call number registered in pair with the caller specification number.

The call preferential connection information database 4 stores call preferential connection information including caller specification numbers and called party individual call numbers.

The call connection processing section 5 performs processing of preferentially connecting a call to the ACD system from a caller to a called party individual call number called by the call preferential connection information inquiry section 3.

However, when the call connection processing section 5 cannot perform such preferential connection, it controls the call connection auxiliary processing section 6 to perform wait processing and then performs called party individual ACD call control processing which is performed after such preferential connection becomes possible and called party individual ACD call control processing for another called party who can provide a similar service or split individual ACD call control processing for another ACD position which can provide a similar service.

The call connection auxiliary processing section 6 performs, when a called party to which the call connection processing section 5 tries to preferentially connect a call in its call connection processing is busy or in a termination rejection state and is not in an immediately connectable state, processing of notifying the caller, for example, by a speech guidance that call distribution to the preferential connection called party is being waited for, and performs called party individual ACD call control processing for controlling the ACD system control processing section 7 to perform waiting processing to control a call for each called party individual call number.

The ACD system control processing section 7 is controlled by the call connection auxiliary processing section 6 to perform processing of waiting, together with called party individual ACD call control processing for confirmation in a unit of a caller individual or split individual ACD call control processing for confirmation in a unit of an ACD split upon confirmation of whether an ACD call from a caller can be connected to some other called party than a called party to whom the ACD call cannot be connected, that the terminating call is distributed to one of the called parties and connecting the ACD call to the called party one of whose telephone circuits in the waited state has become free.

The call connection information recognition section 8 performs, when a call from a caller to the ACD system is connected to a called party by call control to establish a talking state, automatic recognition processing of a set of the called party individual call number of the called party who responds to the call and the caller specification number of the caller recognized by the caller specification number recognition section 2 upon termination of the call as call preferential connection information of the ACD system.

The call preferential connection information storage section 9 performs processing of storing call preferential connection information recognized by the call connection information automatic recognition section 8 and placing the call preferential connection information into the call preferential connection information database 4.

The ACD split 10 includes a plurality of called party ACD positions 10-a, 10-b and 10-c in a unit of a work in charge. If a called party responds once, then the called party individual call number of the responding called party is stored as a full-service called party of the ACD position together with the caller specification number into the call preferential connection information database 4.

It is to be noted that the remaining part of the automatic all distribution system has a similar construction to that of the conventional ACD system and does not have a direct relationship to the present invention, and therefore, detailed description of the construction is omitted herein.

Figure 2:
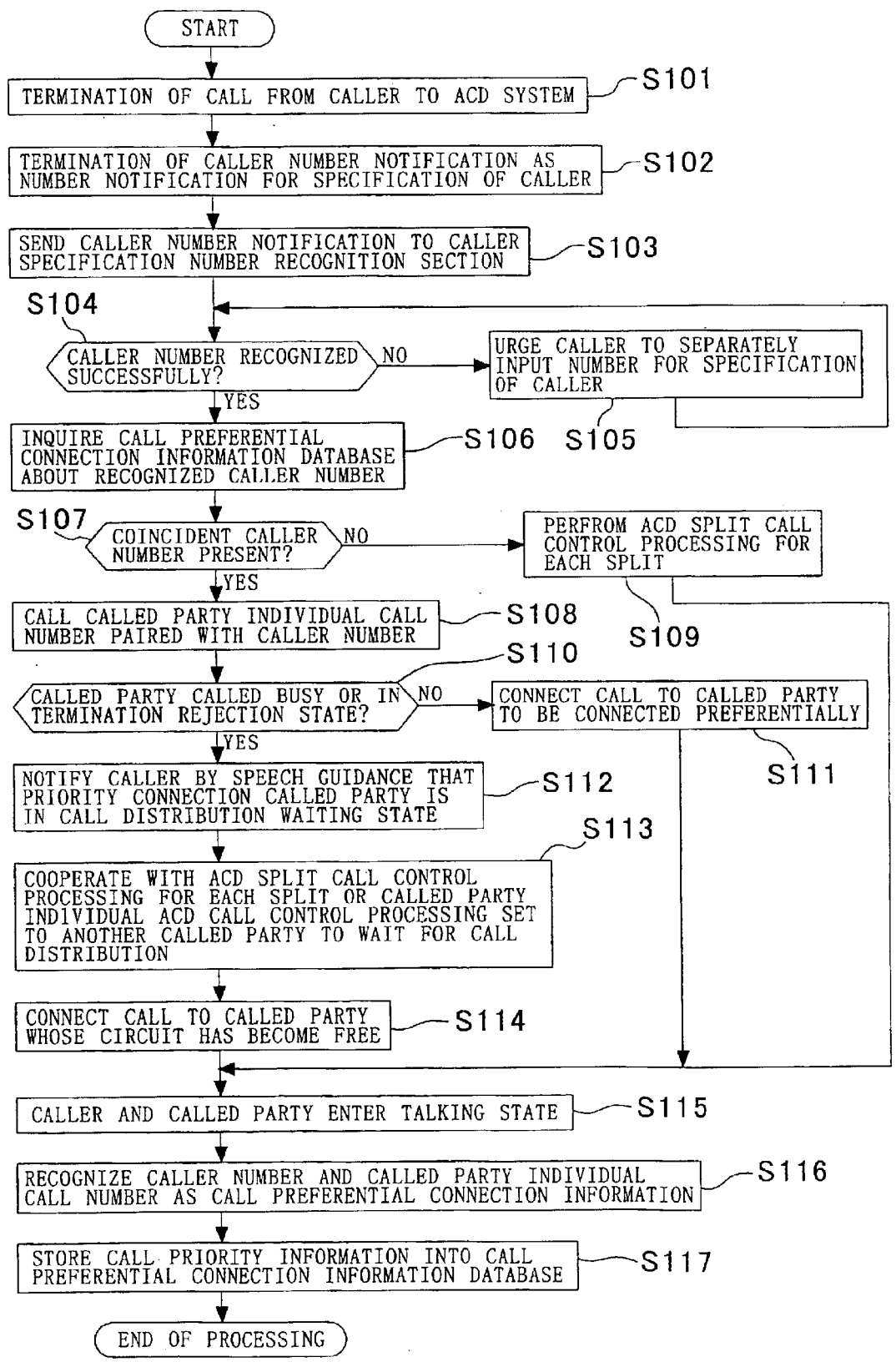
FIG. 2 is a flow chart illustrating called party ACD call control processing of the automatic call distribution system of FIG. 1.

Subsequently, called party individual ACD call control processing of the first embodiment is described with reference to FIG. 2 in addition to FIG. 1. It is assumed here that the call preferential connection information database 4 initially has no call preferential connection information registered therein.

If an ACD call terminates from a caller at the ACD system (step S101 of FIG. 2), then it is connected to the caller specification number recognition section 2 (step S102), and the caller specification number recognition section 2 detects a telephone number of the caller from the ACD call, for example, through a caller number notification service (step S103). Then, the caller specification number recognition section 2 performs recognition processing of the detected caller number by means of the caller specification number automatic recognition processing section 21 (step S104).

If the caller specification number automatic recognition processing section 21 fails to recognize the caller number in step S104, then the caller specification number input value recognition processing section 22 performs processing of urging the caller to input a number for specifying the caller such as, for example, signaling of a speech guidance (step S105). Then, caller specification number automatic recognition processing section 21 detects a caller number sent from the caller in response to the urging processing (steps S101 to S103) and performs the recognition processing in step S104 again.

If the caller specification number recognition section 2 successfully recognizes the caller number in step S104, then it signals the recognized caller number to the call preferential connection information inquiry section 3. The call preferential connection information inquiry section 3 inquires the call preferential connection information database 4 about the caller number received from the caller specification number recognition section (step S106) and discriminates whether or not a coincident caller number is present (step S107).

If the call preferential connection information inquiry section 3 discriminates in step S107 that a coincident caller number is "absent" (because the call preferential connection information database 4 initially has no call preferential connection information registered therein), then it performs ACD split call control processing similarly as in the conventional ACD system (step S109), whereafter the control advances to step S115.

If the call preferential connection information inquiry section 3 discriminates in step S107 that a coincident caller number is "present", that is, a called party who has responded to the same caller in the past is present, then it reads out a called party individual call number stored in pair with the caller number in the call preferential connection information database 4 (step S108) and discriminates whether or not the corresponding ACD position can respond (step S110).

If the result of discrimination in step S110 is that the response is "possible", then the call preferential connection information inquiry section 3 connects the ACD call preferentially to the corresponding ACD position or called party (step S111), whereafter the processing advances to step S115.

If the result of discrimination in step S110 is that the response is "impossible" because the ACD position or called party is busy in responding to another call or has a temporary termination rejection state set thereto from some reason, for example, because the attendant or called party is absent, then the call preferential connection information inquiry section 3 notifies the call connection auxiliary processing section 6 of this.

The call connection auxiliary processing section 6 which receives the notification that termination at the ACD position is impossible notifies the caller by a speech guidance that the "priority called party is waiting for distribution of the call" (step S112). Then, the ACD system control processing section 7 performs called party individual ACD call control processing set for each called party individual call number to the called party who is in a state wherein the ACD call from the caller cannot be connected to the called party.

In particular, when connection is impossible even if the called party is called in accordance with a called party individual call number, called party individual ACD call control processing means 71-*a* of the ACD system control processing section 7 set for each of the called party individual call numbers cooperates with called party individual ACD call control processing means 71-*b* and 71-*c* for confirmation in a unit of a called party individual and split individual ACD call control processing means 72 for confirmation of a unit of an ACD split to wait for distribution of the call thereto (S113).

The ACD call which has been in the waiting state is connected to an ACD position one of whose waited telephone circuits has become free (step S114), and the caller and the called party enter a talking state (step S115).

After the talking state is entered in step S115, the call connection information automatic recognition section 8 recognizes the called party individual call number of the called party who has responded and the caller specification number of the caller recognized by the caller specification number recognition section 2 upon termination in pair as call preferential connection information (step S116) and stores the call preferential connection information into the call preferential connection information storage section 9 once and then places it into the call preferential connection information database 4 (step S117).

Consequently, the called party who has responded to the ACD call becomes a full-service called party for later ACD calls from the same caller. It is to be noted that the registration of the full-service called party, that is, the call preferential connection information registered in the call preferential connection information database 4, may be deleted if no call is terminated from the same caller for a predetermined period of time.

In this manner, according to the automatic call distribution system of the first embodiment, an ACD call is distributed by an existing ACD distribution function, and when the ACD call is terminated at an ACD split in charge, a caller number is detected. Then, the call preferential connection information database is searched based on the detected caller number to detect whether or not there is a registration of the caller number, and if the caller number is registered, then a called party individual call number registered corresponding to the caller number is read out. Then, ACD call control is performed to connect the ACD call preferentially to a called party of the called party individual call number. Consequently, the full-service called party can respond to the same caller. Accordingly, in response to the same or relating inquiry from the same caller, the called party can understand contents of the inquiry. Therefore, the caller need not explain the contents of the inquiry in detail to the called party from the beginning. Consequently, augmentation in service to the caller can be anticipated, and the talking time is shortened and the efficiency of use of the circuit is augmented.

Further, when the caller number detected upon termination is not registered in the call preferential connection information database 4, a called party individual call number of a called party who responds to the call is automatically registered into the call preferential connection information database together with the caller specification number. Consequently, when a call is terminated from the same caller later, the full-service called party can respond to the call.

Further, when a full-service called party registered in the call preferential connection information database is busy or in a termination rejection state, waiting processing for the ACD call is performed. Consequently, it can be waited that the call is distributed by called party individual ACD call control processing set for each called party individual call number to the called party to which the call cannot be connected at present together with called party individual ACD call control processing for confirmation in a unit of a called party individual or split individual ACD call control processing for confirmation of a unit of an ACD split of call connection processing to some other called party other than the called party. Consequently, even if a call cannot be connected to the full-service called party and ACD waiting processing is performed, ACD call control processing, for example, for connection to some other called party having a skill proximate to or higher than the skill of the full-service called party, connection to a called party or an ACD split which has a comparatively high free circuit ratio and so forth, which has not been realized with conventional automatic call distribution systems, can be realized.

Figure 3:
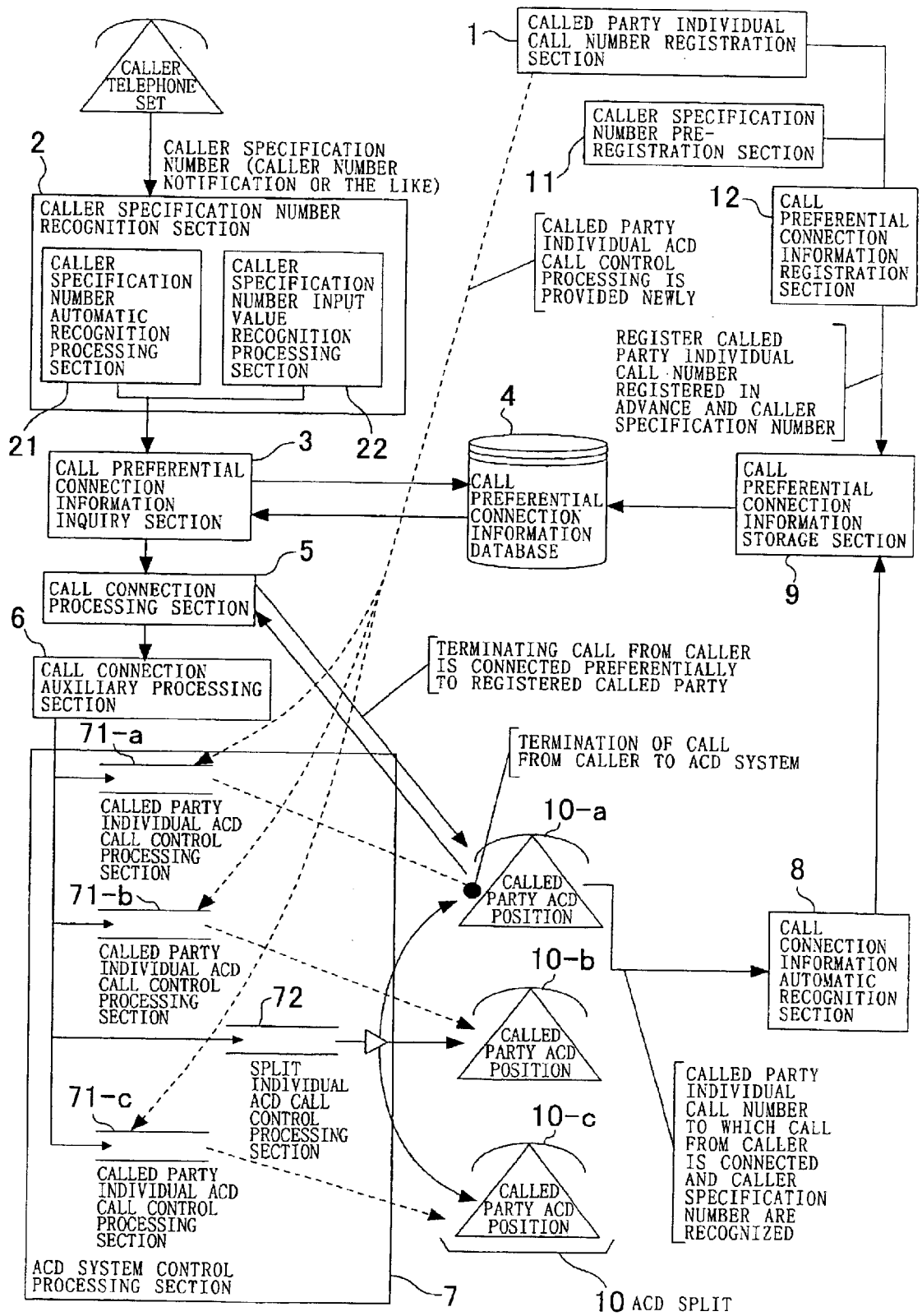
FIG. 3 is a block diagram showing a main construction of another automatic call distribution system to which the present invention is applied.

Subsequently, another automatic call distribution system to which the present invention is applied is described with reference to FIG. 3.

The automatic call distribution system of the second embodiment shown in FIG. 3 includes a caller specification number pre-registration section 11 and a call preferential connection information registration section 12 in addition to the components of the automatic all distribution system of the first embodiment described hereinabove with reference to FIG. 1.

The caller specification number pre-registration section 11 registers a caller number for specification of a particularly significant client or user in advance as ACD system data.

The call preferential connection information registration section 12 has a registration section for preferentially connecting, when a call to the ACD system from a caller who has a caller specification number registered in advance in the caller specification number pre-registration section 11 terminates, the ACD call to the called party individual call number registered in the called party individual call number registration section 1.

Consequently, the call preferential connection information registration section 12 registers a caller number for specification of a particularly significant client or user registered in the caller specification number pre-registration section 11 and a called party individual call number registered in the called party individual call number registration section 1 in pair as call preferential connection information in advance into the call preferential connection information database 4 through the call preferential connection information storage section 9.

In this manner, according to the automatic call distribution system of the second embodiment, even if no call has terminated from a caller at the ACD system and the first call is terminated, then the call preferential connection information database is searched based on a caller number detected upon the termination to read out a called party individual call number, and consequently, the call can be connected to a full-service called party.

In other words, since a called party is fixed with respect to a specific client or user, an operator who is skilled in a work unique to the client or user can attend.

Further, since call preferential connection information including a caller specification number of a caller and a call number of a called party to be connected preferentially to an ACD call from the caller is handled as a single ACD system data, when changing or deletion of a called party is required, an ACD system manager can perform registration of another called party having a skill of an equal level to that of a called party with respect to call preferential connection information corresponding to a large number of callers.

As described above, according to automatic call distribution system of the first embodiment of the present invention, before conventional ACD call distribution processing of distributing an ACD call to an unspecific called party is performed, a caller of the ACD call is specified, and an individual call number of a called party corresponding to the specified caller is read out from the call preferential connection information database, and then the ACD call is connected preferentially to the individual call number of the called party. Consequently, the called party who should respond to the same caller can be fixed.

Accordingly, if a call while a caller and a called party are in a talking state is disconnected by some reason or the caller tries to issue an inquiry to the ACD system again, then when the ACD call re-originated from the caller to the ACD system is terminated, the call is connected preferentially to the operator of an ACD position by which the preceding call has been connected. Consequently, contents of the preceding conversion with the operator need not be talked again, and surplus loads to the caller and the called party can be eliminated. Accordingly, augmentation of the efficiency in work of the called party, augmentation in finer service to the caller and augmentation of the degree of satisfaction of the client can be anticipated.

The automatic call distribution system of the second embodiment operates similarly to the automatic call distribution system of the first embodiment. In addition, a caller number of a significant client or a specific user and an individual call number of a full-service called party corresponding to the client or the user are registered as call a preferential connection information in the database in advance. Then, when an ACD call from the important client or the specific user terminates, the called party who corresponds to the caller number is specified from the database and the ACD call is immediately connected preferentially to an ACD position of the full-service called party. Consequently, even if an ACD call is terminated from a caller who has no termination history in the past, a full-service operator can connect the ACD immediately. Accordingly, the automatic call distribution system of the second embodiment exhibits, in addition to the advantages of the automatic call distribution system of the first embodiment described above, an additional advantage that a higher degree of satisfaction of the client can be anticipated.

While preferred embodiments of the present invention have been described using specific terms, such description is for illustrative purposes only, and it is to be understood that changes and variations may be made without departing from the

What is claimed is:

1. An automatic call distribution system, comprising:
   a called party individual call number registration section, a caller specification number recognition section, a call preferential connection information inquiry section, a call preferential connection information database, a call connection processing section, a call connection auxiliary processing section, a control processing section, a call connection information automatic recognition section, a call preferential connection information storage section, and an attendant board group including a plurality of attendant boards;
   said called party individual call number registration section registering called parties who can respond to a call terminating at said attendant board group, said called party individual call number registration section further registering called party individual call numbers for calling a called party for which call control is to be performed;

said caller specification number recognition section including caller specification number automatic recognition processing means for automatically recognizing a number for specifying a caller sent thereto from the caller, and caller specification number input value recognition processing means for urging, when the number for specifying a caller cannot be recognized automatically, the caller to input a number for specifying the caller separately and recognizing a caller specification number sent thereto from the caller;

said call preferential connection information inquiry section performing processing of inquiring said call preferential connection information database about a caller specification number recognized by said caller specification number recognition section and calling, when a coincident caller specification number is present in said database, a caller party individual call number registered in pair with the caller specification number;

said call preferential connection information database storing call preferential connection information including caller specification numbers and called party individual call numbers;

said call connection processing section performing processing of preferentially connecting a call from a caller to a called party individual call number called by said call preferential connection information inquiry section, said call connection processing section controlling, when said call connection processing section cannot perform such preferential connection, said call connection auxiliary processing section to perform wait processing;

said call connection auxiliary processing section performing, when a called party to which said call connection processing section tries to preferentially connect a call in the call connection processing thereof is busy or in a termination rejection state and is not in an immediately connectable state, processing of notifying the caller that call distribution to the preferential connection called party is being waited for;

said call connection information recognition section performing, when said call preferential connection information inquiry section asks said call preferential connection information database about a caller specification number recognized by said caller specification number recognition section and finds out, as a result, that the caller specification number is not registered, automatic recognition processing of a set of the caller specification number and a called party individual call number of a called party who responds to the call as new call preferential connection information for determining the set of the caller specification number and the called party individual call number as an exclusive called party for a next call from the same caller; and said call preferential connection information storage section storing call preferential connection information recognized by said call connection information automatic recognition section into said call preferential connection information database.

2. An automatic call distribution system according to claim 1, further comprising a caller specification number pre-registration section for registering a caller number in advance, and a call preferential connection information registration section for registering, when a call from a caller who has a caller specification number registered in advance in said caller specification number pre-registration section terminates, the call preferentially to the called party individual call number registered in said called party individual call number registration section.

* * * * *